US007878934B2

(12) United States Patent
Lee

(10) Patent No.: US 7,878,934 B2
(45) Date of Patent: Feb. 1, 2011

(54) HYDRAULIC CONTROL SYSTEM OF EIGHT-SPEED AUTOMATIC TRANSMISSION FOR A VEHICLE

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 620 days.

(21) Appl. No.: 11/966,510

(22) Filed: Dec. 28, 2007

(65) Prior Publication Data

US 2009/0118097 A1    May 7, 2009

(30) Foreign Application Priority Data

Nov. 6, 2007    (KR) .................... 10-2007-0112686

(51) Int. Cl.
*F16H 61/686* (2006.01)
(52) U.S. Cl. ..................................... 475/128
(58) Field of Classification Search .............. 475/127, 475/128
See application file for complete search history.

(56) References Cited

U.S. PATENT DOCUMENTS

| | | | | |
|---|---|---|---|---|
| 7,261,662 B2* | 8/2007 | Nozaki et al. | ............. | 475/119 |
| 7,419,452 B2* | 9/2008 | Nozaki et al. | ............. | 475/123 |
| 7,524,267 B2* | 4/2009 | Nozaki et al. | ............. | 477/130 |
| 7,618,344 B2* | 11/2009 | Hayashi et al. | ............. | 477/131 |
| 7,625,313 B2* | 12/2009 | Kondo et al. | ............. | 477/144 |
| 7,666,112 B2* | 2/2010 | Long et al. | ............. | 475/128 |
| 7,717,821 B2* | 5/2010 | Steinhauser et al. | ............. | 477/79 |
| 7,740,557 B2* | 6/2010 | Kondo et al. | ............. | 477/69 |
| 2009/0111646 A1* | 4/2009 | Hong | ............. | 477/71 |

FOREIGN PATENT DOCUMENTS

DE    10 2008 000 119    * 7/2009

\* cited by examiner

*Primary Examiner*—Sherry Estremsky
(74) *Attorney, Agent, or Firm*—Morgan, Lewis & Bockius LLP

(57) ABSTRACT

Eight forward speeds and one reverse speed of an automatic transmission are achieved by: controlling a first clutch by a first pressure control valve controlled a first proportional control solenoid valve and a first pressure switching valve; controlling a second clutch by a second pressure control valve controlled by a second proportional control solenoid valve and a second pressure switching valve; controlling a third clutch by a third pressure control valve controlled by a third proportional control solenoid valve and a third pressure switching valve; controlling a first brake by first and second switching valves and a fourth pressure control valve controlled by a fourth proportional control solenoid valve and a fourth pressure switching valve; and controlling a second brake by a fifth pressure control valve controlled by a fifth proportional control solenoid valve and a fifth pressure switching valve.

23 Claims, 9 Drawing Sheets

FIG.2

|  | Friction member | | | | |
| --- | --- | --- | --- | --- | --- |
|  | C1 | C2 | C3 | B1 | B2 |
| 1st | ○ |  |  | ○ | ○ |
| 2nd |  |  | ○ | ○ | ○ |
| 3rd | ○ |  | ○ |  | ○ |
| 4th |  | ○ | ○ |  | ○ |
| 5th | ○ | ○ |  |  | ○ |
| 6th | ○ | ○ | ○ |  |  |
| 7th | ○ | ○ |  | ○ |  |
| 8th |  | ○ | ○ | ○ |  |
| reverse |  | ○ |  | ○ | ○ |

HYDRAULIC CONTROL SYSTEM OF EIGHT-SPEED AUTOMATIC TRANSMISSION FOR A VEHICLE

CROSS-REFERENCE TO RELATED APPLICATION

This application claims priority to and the benefit of Korean Patent Application No. 10-2007-0112686, filed in the Korean Intellectual Property Office on Nov. 6, 2007, the entire contents of which are incorporated herein by reference.

BACKGROUND OF THE INVENTION (a) Field of the Invention

The present invention relates to an automatic transmission for a vehicle. More particularly, the present invention relates to a hydraulic control system of an eight-speed automatic transmission for a vehicle.

(b) Description of the Related Art

Typical automatic transmissions include a torque converter and a powertrain of a multiple speed gear mechanism connected to the torque converter. In addition, a hydraulic control system is provided at an automatic transmission for selectively operating at least one operational element included in the powertrain according to a running state of a vehicle.

Such an automatic transmission includes a powertrain and a hydraulic control system. The powertrain includes a compound planetary gear set, formed by combining at least two simple planetary gear sets to achieve the required multiple speeds, and a plurality of friction members. The hydraulic control system selectively operates the friction members of the powertrain according to driving conditions.

A variety of such powertrains and hydraulic control systems have been developed by vehicle manufacturers according to their own schemes. Currently, four-speed automatic transmissions are most often found on the market. However, a five or six speed automatic transmission has also been realized for enhancement of performance of power transmission and for enhanced fuel mileage of a vehicle.

Recently developed automatic transmissions achieve eight forward speeds for better performance and fuel efficiency of a vehicle, and therefore, it is required for provide a hydraulic control system for such eight-speed automatic transmission that provides a precise control and enhanced durability of the transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hydraulic control system of an eight-speed automatic transmission for a vehicle having advantages of precise control and optimized fuel efficiency.

An exemplary embodiment of the present invention provides a hydraulic control system of an eight-speed automatic transmission for a vehicle for controlling a first clutch operated at first, third, fifth, sixth, and seventh forward speeds, a second clutch operated at fourth, fifth, sixth, seventh, and eighth forward speeds and a reverse speed, a third clutch operated at second, third, fourth, sixth, and eighth forward speeds and a reverse speed, a first brake operated at first, second, seventh, and eighth forward speeds and a reverse speed, and a second brake operated at first, second, third, fourth, and fifth forward speeds and a reverse speed.

The hydraulic control system includes: a first clutch control portion that supplies an output pressure of a first pressure control valve to the first clutch, the first pressure control valve being controlled by output pressures of a first proportional control solenoid valve and a first pressure switching valve; a second clutch control portion that supplies an output pressure of a second pressure control valve to the second clutch, the second pressure control valve being controlled by output pressures of a second proportional control solenoid valve and a second pressure switching valve; a third clutch control portion that supplies an output pressure of a third pressure control valve to the third clutch, the third pressure control valve being controlled by output pressures of a third proportional control solenoid valve and a third pressure switching valve; a first brake control portion that supplies an output pressure of a fourth pressure control valve to the first brake at the first, second, seventh, and eighth forward speeds and a reverse range pressure of a manual valve to the first brake at the reverse speed, the fourth pressure control valve being controlled by output pressures of a fourth proportional control solenoid valve and a fourth pressure switching valve; and a second brake control portion that supplies an output pressure of a fifth pressure control valve to the second brake, the fifth pressure control valve being controlled by output pressures of a fifth proportional control solenoid valve and a fifth pressure switching valve.

The first, third, and fourth pressure control valves may control a forward range pressure supplied from the manual valve, and the second and fifth pressure control valves may control a line pressure.

The first, second, third, fourth, and fifth proportional control solenoid valves may be supplied with a reduced pressure of a first reducing valve.

The first, second, third, fourth, and fifth pressure switching valves may be controlled by a reduced pressure of a second reducing valve and the output pressures of the first, second, third, fourth, and fifth proportional control solenoid valves that are independently controlled.

Partial pressures of hydraulic pressures supplied from the first, second, third, fourth, and fifth pressure control valves to corresponding friction members may be supplied from the first, second, third, fourth, and fifth pressure switching valves to the first, second, third, fourth, and fifth pressure control valves as their control pressures.

In the first clutch control portion, the first pressure control valve may be integrally formed with the first proportional control solenoid valve, and the first pressure switching valve may be controlled by output pressures of the first proportional control solenoid valve and the second reducing valve and supplies a partial pressure of the output pressure of the first pressure control valve to the first pressure control valve as its control pressure.

The first pressure control valve includes a valve body and a valve spool. The valve body of the first pressure control valve may include: a first port that receives a control pressure from the first proportional control solenoid valve; a second port that receives the forward range pressure from the manual valve; a third port that selectively supplies the hydraulic pressure received through the second port to the first clutch; a fourth port that exhausts the hydraulic pressure supplied to the third port; and a fifth port that receives the partial hydraulic pressure of the third port through the first pressure switching valve. The valve spool of the first pressure control valve may include: a first land that receives the control pressure supplied from the first port; a second land that selectively opens or closes the fourth port; and a third land that selectively enables fluid communication of the second and third ports, cooperatively with the second land. An elastic member may be arranged between the third land and the valve body so as to form an elastic force for biasing the valve spool toward the first port.

The first pressure switching valve includes a valve body and a valve spool. The valve body of the first pressure switching valve may include: a first port that receives the control pressure of the second reducing valve; a second port that receives the control pressure of the first proportional control solenoid valve from an opposite side of the first port: a third port that receives a partial pressure of the hydraulic pressure supplied to the first clutch; a fourth port that is connected with the fifth port of the first pressure control valve; and a fifth port that exhausts the hydraulic pressure supplied to the fourth port. The valve spool of the first pressure switching valve may include: a first land that receives the control pressure supplied through the first port and selectively opens and closes the fifth port; a second land that receives the control pressure supplied through the second port: and a second land that selectively opens or closes the third port and selectively enables fluid communication of the fourth and fifth ports, cooperatively with the first land. An elastic member may be arranged between the second land and the valve body so as to form an elastic force for biasing the valve spool toward the first port.

In the second clutch control portion, the second pressure control valve may be integrally formed with the second proportional control solenoid valve, and the second pressure switching valve may be controlled by output pressures of the second proportional control solenoid valve and the second reducing valve and supplies a partial pressure of the output pressure of the second pressure control valve to the second pressure control valve as its control pressure.

The second pressure control valve includes a valve body and a valve spool. The valve body of the second pressure control valve may include: a first port that receives a control pressure from the second proportional control solenoid valve; a second port that receives the line pressure; a third port that selectively supplies the hydraulic pressure received through the second port to the second clutch; a fourth port that exhausts the hydraulic pressure supplied to the third port; and a fifth port that receives the partial hydraulic pressure of the third port through the second pressure switching valve. The valve spool of the second pressure control valve may include: a first land that receives the control pressure supplied from the first port; a second land that selectively opens or closes the fourth port; and a third land that selectively enables fluid communication of the second and third ports, cooperatively with the second land. An elastic member may be arranged between the third land and the valve body so as to form an elastic force for biasing the valve spool, toward the first port.

The second pressure switching valve includes a valve body and a valve spool. The valve body of the second pressure switching valve may include: a first port that receives the control pressure of the second reducing valve; a second port that receives the control pressure of the second proportional control solenoid valve from an opposite side of the first port; a third port that receives a partial pressure of the hydraulic pressure supplied to the second clutch; a fourth port that is connected with the fifth port of the second pressure control valve; and a fifth port that exhausts the hydraulic pressure supplied to the fourth port. The valve spool of the second pressure switching valve may include: a first land that receives the control pressure supplied through the first port; a second land that selectively opens and closes the fifth port; and a third land that is controlled by the control pressure supplied through the second port and selectively enables fluid communication of the third and fourth ports and fluid communication of the fourth and fifth ports, cooperatively with the second land. An elastic member may be arranged between the third land and the valve body so as to form an elastic force for biasing the valve spool toward the first port.

In the third clutch control portion, the third pressure control valve may be integrally formed with the third proportional control solenoid valve, and the third pressure switching valve may be controlled by output pressures of the third proportional control solenoid valve and the second reducing valve and supplies a partial pressure of the output pressure of the third pressure control valve to the third pressure control valve as its control pressure.

The third pressure control valve includes a valve body and a valve spool. The valve body of the third pressure control valve may include: a first port that receives a control pressure from the third proportional control solenoid valve; a second port that receives the forward range pressure from the manual valve; a third port that selectively supplies the hydraulic pressure received through the second port to the third clutch; a fourth port that exhausts the hydraulic pressure supplied to the third port; and a fifth port that receives the partial hydraulic pressure of the third port through the third pressure switching valve. The valve spool of the third pressure control valve may include: a first land that receives the control pressure supplied from the first port; a second land that selectively opens or closes the fourth port; and a third land that selectively enables fluid communication of the second and third ports, cooperatively with the second land. An elastic member may be arranged between the third land and the valve body so as to form an elastic force for biasing the valve spool toward the first port.

The third pressure switching valve includes a valve body and a valve spool. The valve body of the third pressure switching valve may include: a first port that receives the control pressure of the second reducing valve; a second port that receives the control pressure of the third proportional control solenoid valve from an opposite side of the first port; a third port that receives a partial pressure of the hydraulic pressure supplied to the third clutch; a fourth port that is connected with the fifth port of the third pressure control valve; a fifth port that receives the control pressure from the fifth proportional control solenoid valve; a sixth port supplies the control pressure of the fifth port to the fifth pressure control valve; and a seventh port that exhausts the hydraulic pressure supplied to the sixth port. The valve spool of the third pressure switching valve may include: a first land that receives the control pressure supplied through the first port; a second land that selectively enables the sixth port to fluidly communicate the fifth port and the seventh port, cooperatively with the first land; a third land that is controlled by the control pressure supplied through the second port; and a third land that selectively enables fluid communication of the third and fourth ports and fluid communication of the fourth and seventh ports, cooperatively with the second land. An elastic member may be arranged between the third land and the valve body so as to form an elastic force for biasing the valve spool toward the first port.

In the first brake control portion, the fourth pressure control valve may be integrally formed with the fourth proportional control solenoid valve, the fourth pressure switching valve may be controlled by output pressures of the fourth proportional control solenoid valve and the second reducing valve and supplies a partial pressure of the output pressure of the fourth pressure control valve to the fourth pressure control valve as its control pressure, the first switching valve supplies a hydraulic pressure supplied from the fourth proportional control solenoid valve to the first brake or the reverse range pressure to the first brake, and the second switching valve supplies the reverse range pressure of the manual valve to the first switching valve.

The fourth pressure control valve includes a valve body and a valve spool. The valve body of the fourth pressure control valve may include: a first port that receives a control pressure from the fourth proportional control solenoid valve; a second port that receives the forward range pressure from the manual valve; a third port that selectively supplies the hydraulic pressure received through the second port to the first switching valve; a fourth port that exhausts the hydraulic pressure supplied to the third port; and a fifth port that receives the partial hydraulic pressure of the third port through the fourth pressure switching valve. The valve spool of the fourth pressure control valve may include: a first land that receives the control pressure supplied from the first port; a second land that selectively opens or closes the fourth port; and a third land that selectively enables fluid communication of the second and third ports, cooperatively with the second land. An elastic member may be arranged between the third land and the valve body so as to form an elastic force for biasing the valve spool toward the first port.

The fourth pressure switching valve includes a valve body and a valve spool. The valve body of the fourth pressure switching valve may include: a first port that receives the control pressure of the second reducing valve; a second port that receives the control pressure of the fourth proportional control solenoid valve from an opposite side of the first port; a third port that receives a partial pressure of the hydraulic pressure supplied to the first switching valve; and a fourth port that is connected with the fifth port of the fourth pressure control, valve. The valve spool of the fourth pressure switching valve may include: a first land that receives the control pressure supplied through the first port; and a second land that receives the control pressure supplied through the second port and selectively enables fluid communication of the third and fourth ports, cooperatively with the second land. An elastic member may be arranged between the second land and the valve body so as to form an elastic force for biasing the valve spool toward the first port.

The first switching valve includes a valve body and a valve spool. The valve body of the first switching valve may include: a first port that receives the reverse range pressure from the second switching valve as a control pressure; a second port simultaneously receives the reverse range pressure supplied to the first port; a third port that receives the control pressure of the fourth pressure control valve: and a fourth port supplies the hydraulic pressure received through the second or third, ports and to the first brake. The valve spool of the first switching valve may include: a first land that receives the control pressure supplied through the first port; a second land that selectively opens or closes the third port; and a third land that selectively enables the fourth port to fluidly communicate with the second or third ports, cooperatively with the second land. An elastic member may be arranged between the third land and the valve body so as to form an elastic force for biasing the valve spool toward the first port.

The second switching valve includes a valve body and a valve spool. The valve body of the second switching valve may include: a first port that receives the reverse range pressure from the manual valve as a control pressure; a second port that simultaneously receives the reverse range pressure supplied to the first port; a third port that supplies the reverse range pressure of the second port to the first switching valve; and a fourth port that exhausts the hydraulic pressure supplied to the third port. The valve spool of the second switching valve may include: a first land that receives the control pressure supplied through the first port; a second land that selectively enables the third port to fluidly communicate with the second or fourth ports, cooperatively with the first land; and a third land that is abutted by an elastic member. The elastic member may be arranged between the third land and the valve body so as to form an elastic force for biasing the valve spool toward the first port.

In the second brake control portion, the fifth pressure control valve may be integrally formed with the fifth proportional control solenoid valve, and the fifth pressure switching valve may be controlled by output pressures of the fifth proportional control solenoid valve and the second reducing valve and supplies a partial pressure of the output pressure of the fifth pressure control valve to the fifth pressure control valve as its control pressure.

The fifth pressure control valve includes a valve body and a valve spool. The valve body of the fifth pressure control valve may include: a first port that receives a control pressure from the fifth proportional control solenoid valve; a second port that receives the line pressure; a third port that selectively supplies the hydraulic pressure received through the second port to the second brake; a fourth port that exhausts the hydraulic pressure supplied to the third port; a fifth port that receives the partial hydraulic pressure of the third port, through the fifth pressure switching valve; and a sixth port that fluidly communicates with the third pressure switching valve. The valve spool of the fifth pressure control valve may include: a first land that receives the control pressure supplied from the first port; a second land that selectively opens or closes the fourth port; and a third land that selectively enables fluid communication of the second and third ports, cooperatively with the second land. An elastic member may be arranged between the third land and the valve body so as to form an elastic force for biasing the valve spool toward the first port.

The fifth pressure switching valve includes a valve body and a valve spool. The valve body of the fifth pressure switching valve may include: a first port that receives the control pressure of the second reducing valve; a second port that receives the control pressure of the fifth proportional control solenoid valve from an opposite side of the first port; a third port, that receives a partial pressure of the hydraulic pressure supplied to the second brake; a fourth port that is connected with the fifth port of the fifth pressure control valve; and a fifth port that exhausts the hydraulic pressure supplied to the fourth port. The valve spool of the fifth pressure switching valve may include: a first land that receives the control pressure supplied from the first port; a second land that selectively opens or closes the fifth port; and a third land that is controlled by the control pressure supplied through the second port and selectively enables fluid communication of the third and fourth ports. An elastic member may be arranged between the third land and the valve body so as to form an elastic force for biasing the valve spool toward the first port.

According the exemplary embodiment of the present invention, an automatic transmission having 5 friction members may be controlled to achieve eight forward speeds with live proportional control solenoid valves.

By controlling respective friction members by separate proportional control solenoid valves, hydraulic pressure control can become very precise. Therefore, an overall performance of an automatic transmission may be improved by minimizing a shift shock, improving drivability, and enhancing fuel efficiency.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart for frictional members of a powertrain shown in FIG. 1;

Figure 1:
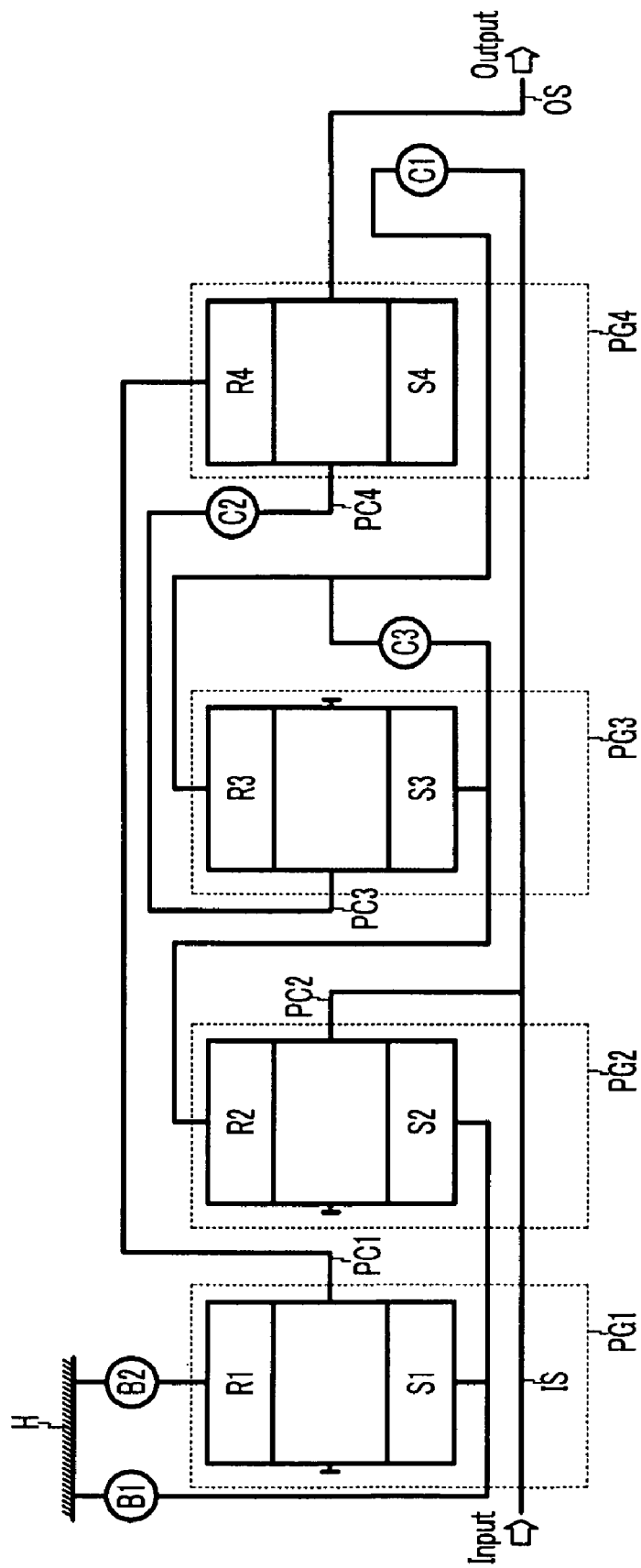
FIG. 1 is a schematic diagram of an exemplary powertrain controlled by a hydraulic control system according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An embodiment of the present invention will hereinafter be described in detail with reference to the accompanying drawings.

FIG. 1 illustrates an exemplary eight-speed powertrain that may be operated by a hydraulic control system according to an exemplary embodiment of the present invention. The powertrain includes four planetary gear sets PG1, PG2, PG3, and PG4, each of which is a single pinion planetary gear set. The four planetary gear sets PG1, PG2, PG3, and PG4 are connected by three clutches C1, C2, and C3 and two brakes B1 and B2.

The first planetary gear set PG1 includes a sun gear, a planet carrier, and a ring gear, and for better comprehension and ease of description, those are called a first sun gear S1, a first planet carrier PC1, and a first ring gear R1.

The second planetary gear set PG2 includes a sun gear, a planet carrier, and a ring gear, and for better comprehension and ease of description, those are called a second sun gear S2, a second planet carrier PC2, and a second ring gear R2.

The third planetary gear set PG3 includes a sun gear, a planet carrier, and a ring gear, and for better comprehension and ease of description, those are called a third sun gear S3, a third planet carrier PC3, and a third ring gear R3.

The fourth planetary gear set PG4 includes a sun gear, a planet carrier, and a ring gear, and for better comprehension and ease of description, those are called a fourth sun gear S4, a fourth planet carrier PC4, and a fourth ring gear R4.

In combining the four planetary gear sets PG1, PG2, PG3, and PG4, the second planet carrier PC2 is directly connected with an input shaft 1S so as to receive an engine speed, and the fourth planet carrier PC4 is directly connected with an output shaft OS so as to act as an output element. The first sun gear S1 is directly connected with the second sun gear S2. The first planet carrier PC1 is directly connected with the fourth ring gear R4. The second ring gear R2 is directly connected with the third sun gear S3. The third ring gear S3 is directly connected with the fourth sun gear S4.

The fourth sun gear S4 is variably connected with the input shaft 1S by a first clutch C1. The third planet carrier PC3 is variably connected with the fourth planet carrier PC4 by a second clutch C2. The third sun gear S3 is variably connected with the fourth sun gear S4 by a third clutch C3.

The first sun gear S1 is variably connected with a transmission housing H by a first brake B1. The first ring gear R1 is variably connected with the transmission housing H by a second brake B2.

Such a structured powertrain may be operated according to an operational chart shown in FIG. 2 to achieve eight forward speeds and one reverse speed. That is, for the first forward speed, the first clutch C1 and the first and second brakes B1 and B2 are operated. For the second forward speed, the third clutch C3 and the first and second brakes B1 and B2 are operated. For the third forward speed, the first and third clutches C1 and C3 and the second brake B2 are operated. For the fourth forward speed, the second and third clutches C2 and C3 and the second brake B2.

For the fifth forward speed, the first and second clutches C1 and C2 and the second brake B2 are operated. For the sixth forward speed, the first, second, and third clutches C1, C2, and C3 are operated. For the seventh forward speed, the first and second clutches C1 and C2 and the first brake B1 are operated. For the eighth forward speed, the second and third clutches C2 and C3 and the first brake B1 are operated. For the reverse speed, the second clutch C2 and the first and second brakes B1 and B2 are operated.

A shifting operation formed by operating the frictional elements according to the operational chart shown in FIG. 2 is obvious to a person of an ordinary skill in the art and thus will not be described in further detail.

Figure 3:
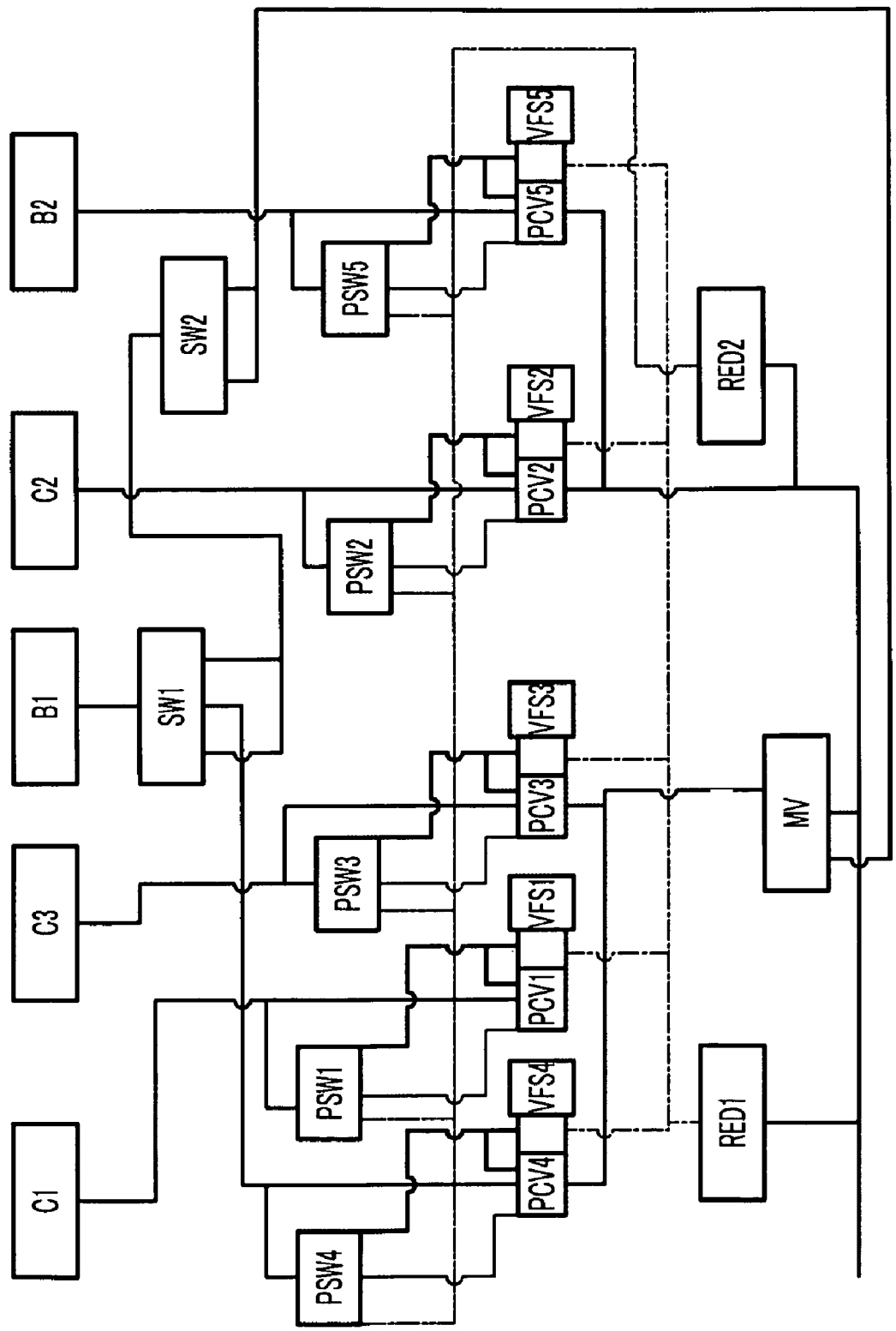
FIG. 3 is a circuit diagram of a hydraulic control system according to an exemplary embodiment of the present invention.

A basic principle of a hydraulic control system for operating such a powertrain is as shown in FIG. 3.

The first clutch C1 is operated by output pressures of a first pressure switching valve PSW1 and a first pressure control valve PCV1 that are controlled by a first proportional control solenoid valve VFS1. The second clutch C2 is operated by output pressures of a second pressure switching valve PSW2 and a second pressure control valve PCV2 that are controlled by a second proportional control solenoid valve VFS2. The third clutch C3 is operated by output pressures of a third pressure switching valve PSW3 and a third pressure control valve PCV3 that are controlled by a third proportional control solenoid valve VFS3.

The first brake B1 is operated by receiving, through a first switching valve SW1, output pressures of a fourth pressure switching valve PSW4 and a fourth pressure control valve PCV4 that are controlled by a fourth proportional control solenoid valve VFS4, or by receiving a reverse range pressure through a second switching valve SW2 and the first switching valve SW1.

The second brake B2 is operated by output pressures of a fifth pressure switching valve PSW5 and a fifth pressure control valve PCV5 that are controlled by a fifth proportional control solenoid valve VFS5.

The first, third, and fourth proportional control solenoid valve VFS1, VFS3, and VFS4 controls a forward range pressure received from a manual valve MV. The second and fifth proportional control solenoid valve VFS2 and VFS5 receives a line pressure.

The first, second, third, fourth, and fifth proportional control solenoid valves VFS1 to VFS5 controls source pressures received from a reduced pressure of a first reducing valve RED1 so as to supply control pressures to the first, second, third, fourth, and fifth pressure control valves PCV1 to PCV5 and the first, second, third, fourth, and fifth pressure switching valves PSW1 to PSW5. The first, second, third, fourth, and fifth pressure switching valves PSW1 to PSW5 receive a reduced pressure of a second reducing valve RED2 as their source pressures.

According to an exemplary embodiment of the present invention, friction members of the first, second, and third clutch C1, C2, and C3 and the first and second brakes B1 and B2 are independently controlled by separate proportional control solenoid valves VFS1 to VFS5 depending on a vehicle driving condition, and therefore, a precise control is enabled.

A hydraulic control system according to an exemplary embodiment of the present invention is hereinafter described in further detail with reference to FIG. 4.

The hydraulic control system according to an exemplary embodiment of the present invention includes a line pressure control portion A, a launch control portion B, first and second pressure reduction control portions C and D, a manual shift control portion F, a first clutch control portion F, a second clutch control portion G, a third clutch control portion H, a first brake control portion I, and a second brake control portion J.

The line pressure control portion A includes a line regulator valve 4 and a proportional control solenoid valve SOL1 controlling the line regulator valve 4, such that a line pressure may be stably formed by a hydraulic pressure generated by a hydraulic pump 2 and the line pressure may be diversified depending on driving conditions of a vehicle for an enhancement of fuel consumption.

The launch control portion B includes a torque converter control valve 6, a damper clutch control valve 8, a proportional control solenoid valve SOL2, and a lock-up switching valve 10. The torque converter control valve 6 enables a torque multiplication effect of a torque converter TC during acceleration, and it reduces the line pressure for a better control of the damper clutch for an enhancement of fuel consumption at a high rotation speed. The damper clutch control valve 8 controls engagement and disengagement of the damper clutch. The proportional control solenoid valve SOL2 controls the damper clutch control valve 8 according to an electrical signal from a transmission control unit TCU.

The first reducing valve RED1 of the first pressure reduction control portion C reduces the hydraulic pressure supplied from the line regulator valve 4 so as to supply it to the proportional control solenoid valves VFS1 to VFS5, SOL1, and SOL2.

The second reducing valve RED2 of the second pressure reduction control portion D reduces the hydraulic pressure supplied from the line regulator valve 4 so as to supply it to the first, second, third, fourth, and fifth pressure switching valves PSW1, PSW2, PSW3, PSW4, and PSW5.

The manual shift control portion H includes a manual valve MV that enables conversion of hydraulic lines according to manual shifting.

The first clutch control portion F includes the first pressure control valve PCV1 and the first, pressure switching valve PSW1. The first pressure control valve PCV1 is integrally formed with the first proportional control solenoid valve VFS1, and controls the hydraulic pressure supplied to the first clutch C1. The first pressure switching valve PSW1 is controlled by output pressures of the first proportional control solenoid valve VFS1 and the second reducing valve RED2. The first pressure switching valve PSW1 takes a partial pressure of the output pressure of the first pressure control valve PCV1 and supplies it to the first pressure control valve PCV1 as its control pressure.

The second clutch control portion G includes the second pressure control valve PCV2 and the second pressure switching valve PSW2. The second pressure control valve PCV2 is integrally formed with the second proportional control solenoid valve VFS2, and controls the hydraulic pressure supplied to the second clutch C2. The second pressure switching valve PSW2 is controlled by output pressures of the second proportional control solenoid valve VFS2 and the second reducing valve RED2. The second pressure switching valve PSW2 takes a partial pressure of the output pressure of the second pressure control valve PCV2 and supplies it to the second pressure control valve PCV2 as its control pressure.

The third clutch control portion H includes the third pressure control valve PCV3 and the third pressure switching valve PSW3. The third pressure control valve PCV3 is integrally formed with the third proportional control solenoid valve VFS3, and controls the hydraulic pressure supplied to the third clutch C3. The third pressure switching valve PSW3 is controlled by output pressures of the third proportional control solenoid valve VFS3 and the second reducing valve RED2. The third pressure switching valve PSW3 takes a partial pressure of the output pressure of the third pressure control valve PCV3 and supplies it to the third pressure control valve PCV3 as its control pressure.

The first brake control portion I includes the fourth pressure control valve PCV4, the fourth pressure switching valve PSW4, the first switching valve SW1, and the second switching valve SW2. The fourth pressure control valve PCV4 is integrally formed with the fourth proportional control solenoid valve VFS4. The fourth pressure switching valve PSW4 is controlled by control pressures of the fourth proportional control solenoid valve VFS4 and the second reducing valve RED2. The fourth pressure switching valve PSW4 takes a partial pressure of the output pressure of the fourth pressure control valve PCV4 and supplies it to the fourth pressure control valve PCV4 as its control pressure. The first switching valve SW1, supplies the hydraulic pressure from the fourth proportional control solenoid valve VFS4 to the first brake B1 or supplies the reverse range pressure to the first brake B1.

The second switching valve SW2 supplies the reverse range pressure from the manual valve MV to the first switching valve SW1.

The second brake control portion J includes the fifth pressure control valve PCV5 and the fifth pressure switching valve PSW5. The fifth pressure control valve PCV5 is integrally formed with the fifth proportional control solenoid valve VFS5, and controls the hydraulic pressure supplied to the second brake B2. The fifth pressure switching valve PSW5 is controlled by control pressures of the fifth proportional control solenoid valve VFS5 and the second reducing valve RED2. The fifth pressure switching valve PSW5 takes a partial pressure of the output pressure of the fifth pressure control valve PCV5 and supplies it to the fifth pressure control valve PCV5 as its control pressure.

Figure 4:
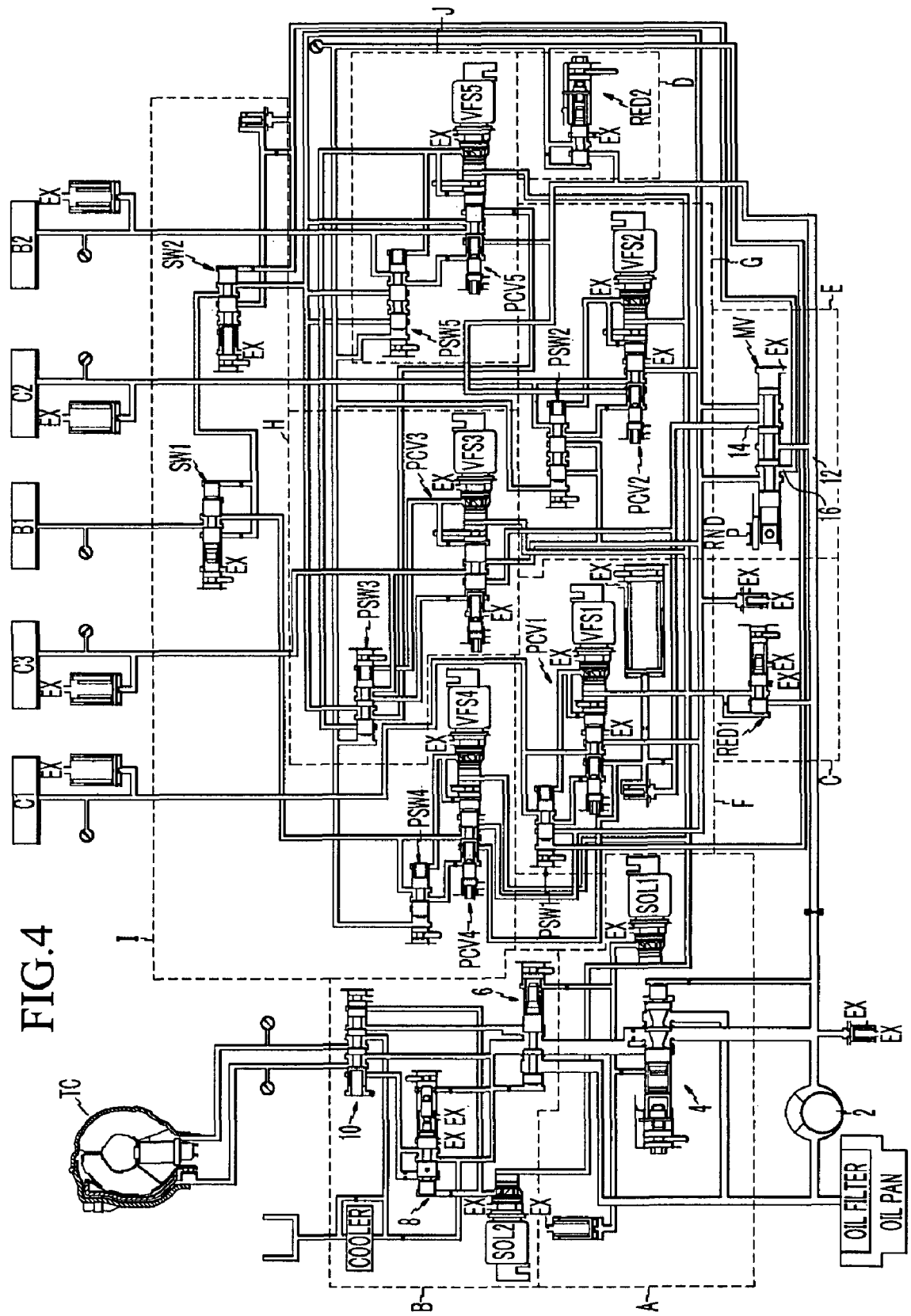
FIG. 4 is a schematic diagram of a hydraulic control system according to an exemplary embodiment of the present invention.

In more detail, as shown in FIG. 4, the manual valve MV receives a hydraulic pressure supplied through a line pressure line 12 connected with the line regulator valve 4 and supplies it through a forward range pressure line 14 and a reverse range pressure line 16 depending on the driving ranges.

The forward range pressure line 14 is connected with the first, third, and fourth pressure control valves PCV1, PCV3, and PCV4, and the reverse range pressure line 16 is connected with the second switching valve SW2.

Figure 5:
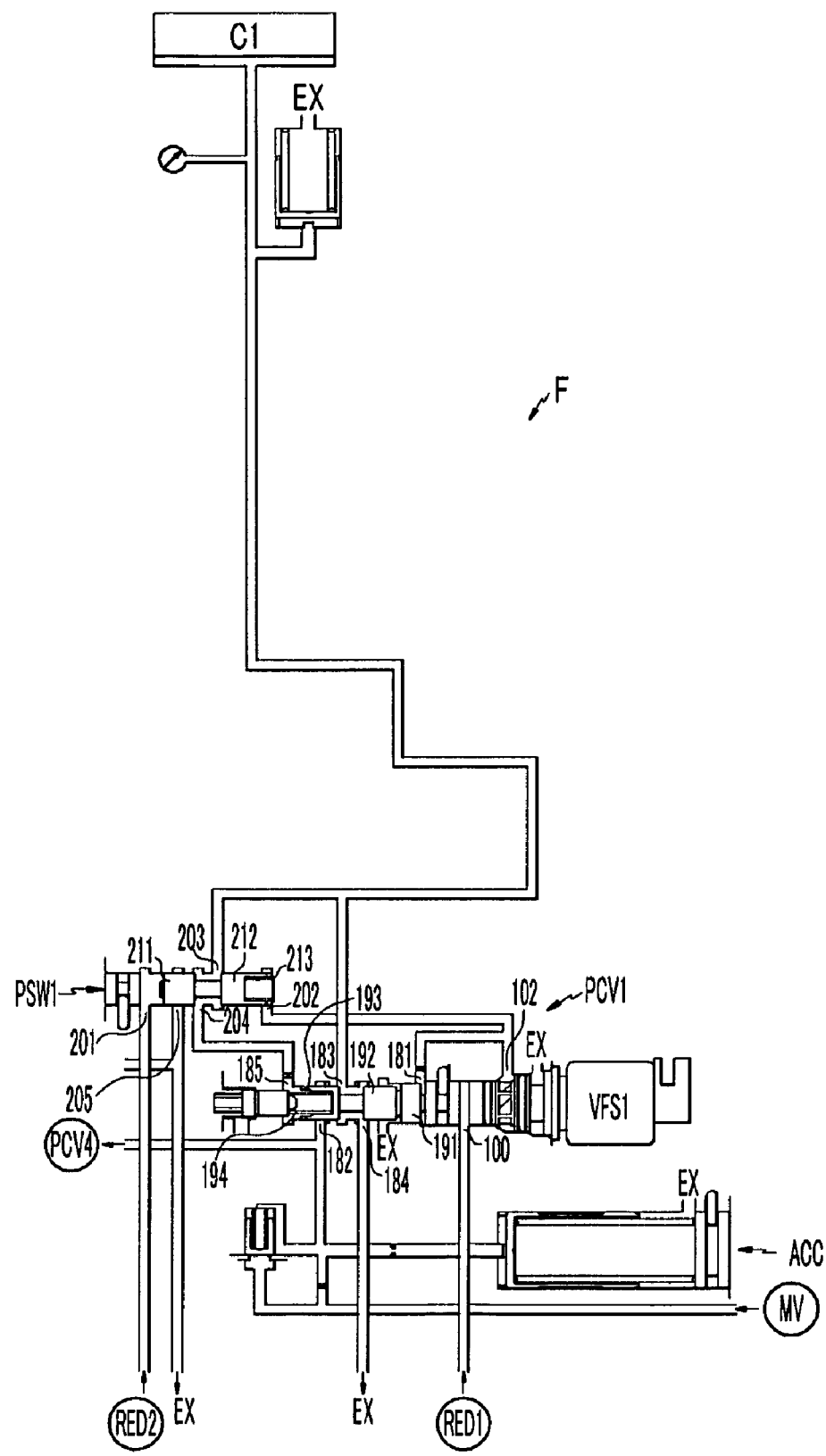
FIG. 5 is a detailed diagram of a first clutch control portion of the hydraulic control system according to an exemplary embodiment of the present invention.

FIG. 5 is a detailed diagram of a first clutch control portion F of the hydraulic control system according to an exemplary embodiment of the present invention.

The first proportional control solenoid valve VFS1 includes an input port 100 and an output port 102. The input port 100 receives the output pressure of the first reducing valve RED1. The output port 102 supplies the pressure of the input port 100 to the first hydraulic pressure control valve PCV1 and the first pressure switching valve PSW1.

The first pressure control valve PCV1 integrally formed with the first proportional control solenoid valve VFS1 includes a valve body and a valve spool installed therein.

The valve body of the first pressure control valve PCV1 includes first, second, third, fourth, and fifth ports 181, 182, 183, 184, and 185. The first port 181 receives a control pressure from the first proportional control solenoid valve VFS1. The second port 182 receives the forward range pressure from the manual valve MV. The third port 183 selectively supplies the hydraulic pressure received through the second port 182 to the first clutch C1. The fourth port 184 exhausts the hydraulic pressure supplied to the third port 183. The fifth port 185 receives the partial hydraulic pressure of the third port 183 through the first pressure switching valve PSW1.

The valve spool of the first pressure control valve PCV1 includes first, second, and third lands 191, 192, and 193. The first land 191 receives the control pressure supplied from the first port 181. The second land 192 selectively opens or closes the fourth port 184. The third land 193 selectively enables fluid communication of the second and third ports 182 and 183, cooperatively with the second land 192.

An elastic member 194 is arranged between the third land 193 and the valve body so as to form an elastic force for biasing the valve spool toward the first port.

By such an arrangement, the valve spool moves left or right by the control pressure of the first proportional control solenoid valve VFS1 and the elastic force of the elastic member 194, such that the hydraulic pressure supplied through the second port 182 is controlled to be selectively supplied to the first clutch C1 through the third port 183.

The first pressure switching valve PSW1 includes a valve body and a valve spool installed therein. The valve body of the first pressure switching valve PSW1 includes first, second, third, fourth, and fifth ports 201, 202, 203, 204, and 205. The first port 201 receives the control pressure of the second reducing valve RED2. The second port 202 receives the control pressure of the first proportional control solenoid valve VFS1 from an opposite side of the first port 201. The third port 203 receives a partial pressure of the hydraulic pressure supplied to the first clutch C1. The fourth port 204 is connected with the fifth port 185 of the first pressure control valve PCV1. The fifth port 205 exhausts the hydraulic pressure supplied to the fourth port 204.

The valve spool of the first pressure switching valve PSW1 includes first and second lands 211 and 212. The first land 211 receives the control pressure supplied through the first port 201 and selectively opens and closes the fifth port 205. The second land 212 is controlled by the control pressure supplied through the second port 202. The second land 212 selectively opens or closes the third port 203, and it selectively enables fluid communication of the fourth and fifth ports 204 and 205, cooperatively with the first land 211.

An elastic member 213 is arranged between the second land 212 and the valve body so as to form an elastic force for biasing the valve spool toward the first port 201.

By such an arrangement, when the first proportional control solenoid valve VFS1 is turned on, the valve spool moves to the left in the drawing so that the third port 203 is closed and the fourth and fifth ports 204 and 205 fluidly communicate with each other. When the first proportional control solenoid valve VFS1 is turned off, the valve spool moves toward the first port by the pressure of the first port 201 so that the third and fourth ports 203 and 204 fluidly communicate with each other.

The reference symbol ACC in the drawing denotes an accumulator that reduces pulsation of a hydraulic pressure.

Figure 6:
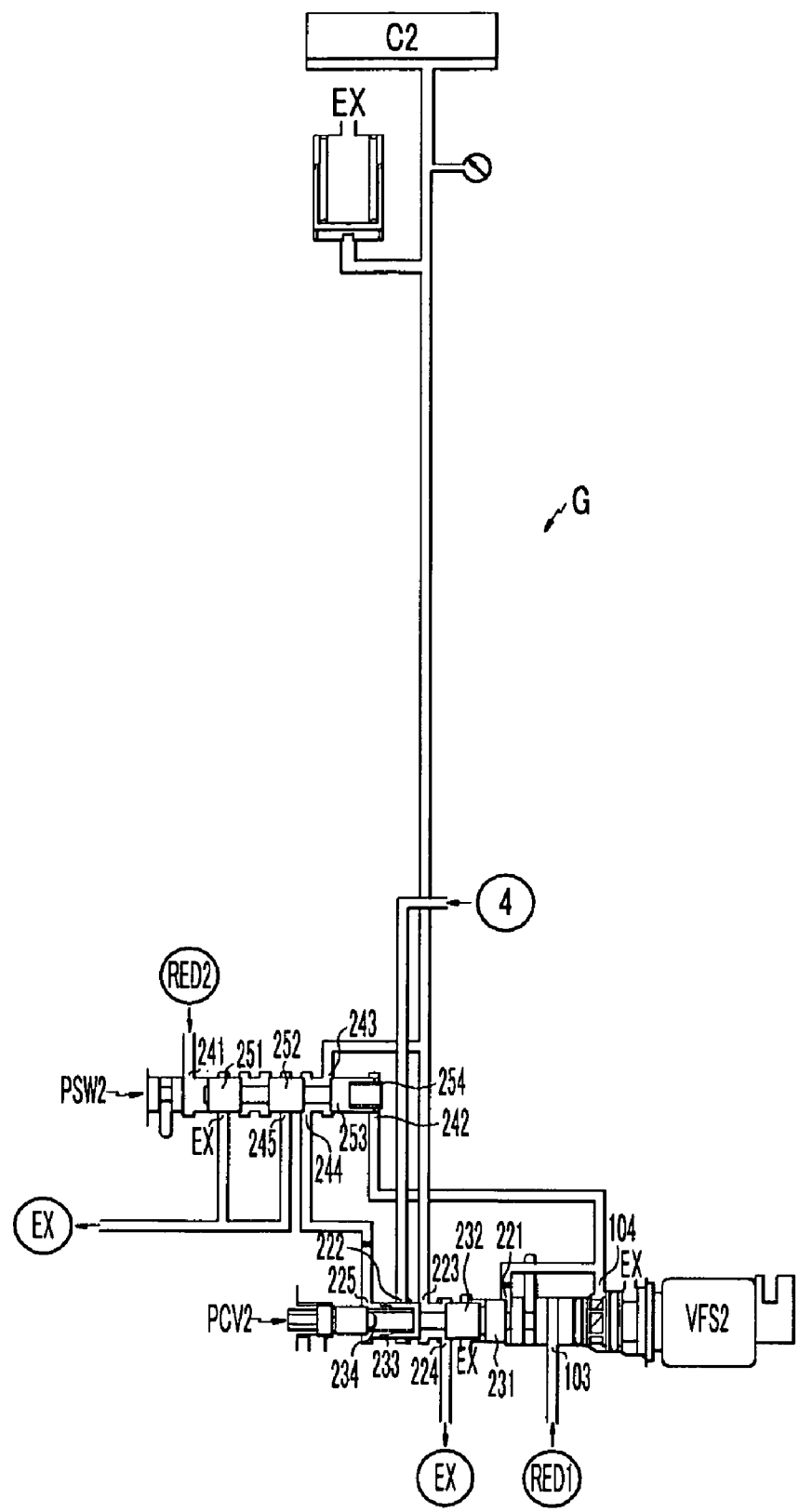
FIG. 6 is a detailed diagram of a second clutch control portion of the hydraulic control system according to an exemplary embodiment of the present invention.

FIG. 6 is a detailed diagram of a second clutch control portion G of the hydraulic control system according to an exemplary embodiment of the present invention.

The second proportional control solenoid valve VFS2 includes an input port 103 and an output port 104. The input port 103 receives the output pressure of the first reducing valve RED1. The output port 104 supplies the hydraulic pressure of the input port 103 to the second pressure control valve PCV2 and the second pressure switching valve PSW2.

The second pressure control valve PCV2 integrally formed with the second proportional control solenoid valve VFS2 includes a valve body and a valve spool installed therein.

The valve body of the second pressure control valve PCV2 includes first, second, third, fourth, and fifth ports 221, 222, 223, 224, and 225. The first port 221 receives a control pressure from the second proportional control solenoid valve VFS2. The second port 222 receives the line pressure of the hydraulic pump 2. The third port 223 selectively supplies the hydraulic pressure received through the second port 222 to the second clutch C2. The fourth port 224 exhausts the hydraulic pressure supplied to the third port 223. The fifth port 225 receives the partial hydraulic pressure of the third port 223 through the second pressure switching valve PSW2.

The valve spool of the second pressure control valve PCV2 includes first, second, and third lands 231, 232, and 233. The first land 231 receives the control pressure from the first port 221. The second land 232 selectively opens or closes the fourth port 224. The third land 233 selectively enables fluid communication of the second and third ports 222 and 223, cooperatively with the second land 232.

An elastic member 234 is arranged between the third land 233 and the valve body so as to form an elastic force for biasing the valve spool toward the first port.

By such an arrangement, the valve spool moves left or right by the control pressure of the second proportional control solenoid valve VFS2 and the elastic force of the elastic member 234, such that the hydraulic pressure supplied through the second port 222 is controlled to be selectively supplied to the second clutch C2 through the third port 223.

A valve body of the second pressure switching valve PSW2 includes first, second, third, fourth, and fifth ports 241, 242, 243, 244, and 245. The first port 241 receives the control pressure of the second reducing valve RED2. The second port 242 receives the control pressure of the second proportional control solenoid valve VFS2 from an opposite side of the first port 241. The third port 243 receives a partial pressure of the hydraulic pressure supplied to the second clutch C2. The fourth port 244 is connected with the fifth port 225 of the second pressure control valve PCV2. The fifth port 245 exhausts the hydraulic pressure supplied to the fourth port 244.

The valve spool of the second pressure switching valve PSW2 includes first, second, and third lands 251, 252, and 253. The first land 251 receives the control pressure supplied of the second reduction valve through the first port 241. The second land 252 selectively opens and closes the fifth port 245. The third land 253 is controlled by the control pressure supplied through the second port 242. The third land 253 selectively enables fluid communication of the third and fourth ports 243 and 244 and fluid communication of the fourth and fifth ports 244 and 245, cooperatively with the second land 252.

An elastic member 254 is arranged between the third land 253 and the valve body so as to form an elastic force for biasing the valve spool toward the first port 241.

By such an arrangement, when the second proportional control solenoid valve VFS2 is turned on, the valve spool moves to the left in the drawing so that the third port 243 is closed and the fourth and fifth ports 244 and 245 fluidly communicate with each other. When the second proportional control solenoid valve VFS2 is turned off, the valve spool moves toward the first port by the hydraulic pressure of the first port 241 so that the third and fourth ports 243 and 244 fluidly communicate with each other.

Figure 7:
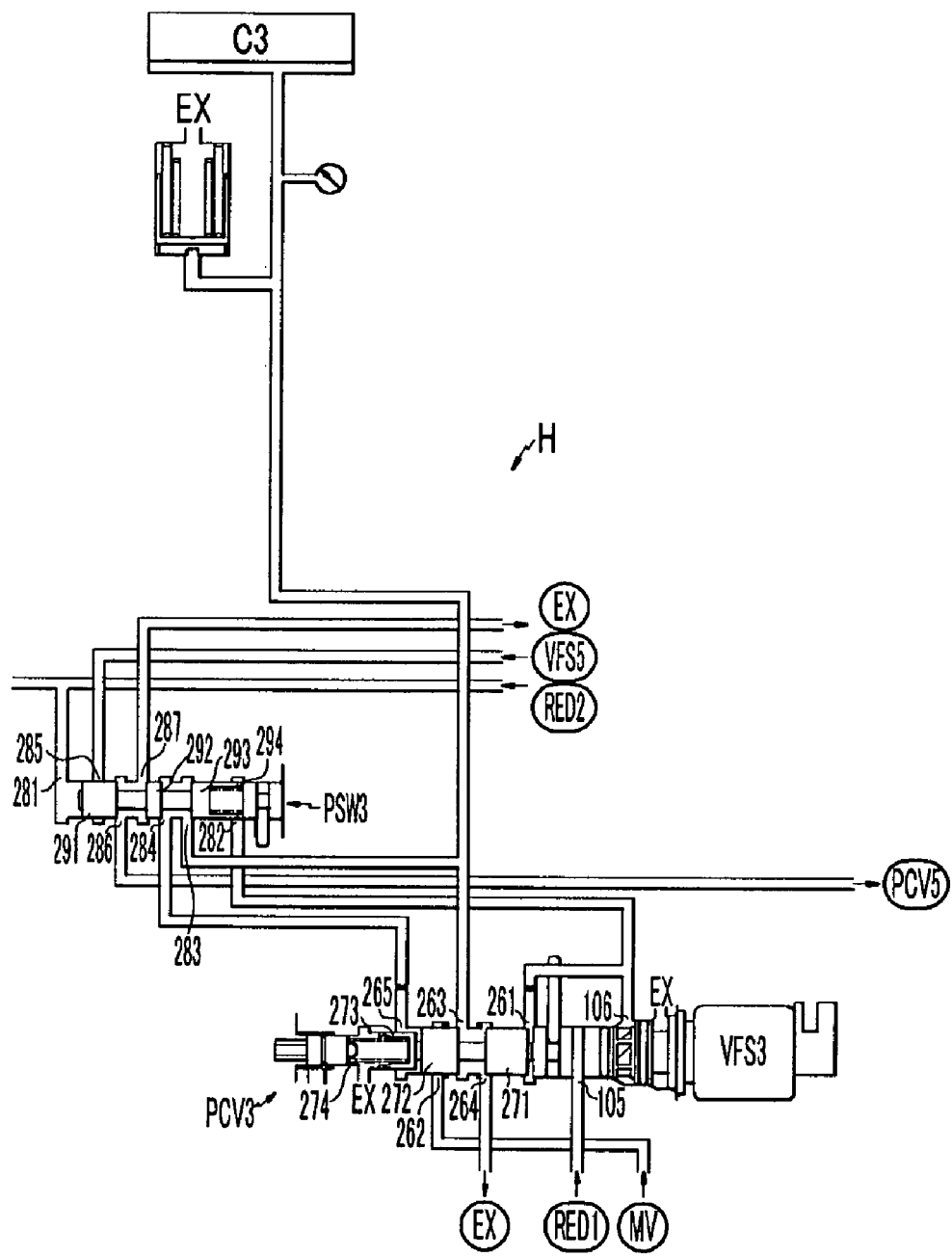
FIG. 7 is a detailed diagram of a third clutch control portion of the hydraulic control system according to an exemplary embodiment of the present invention.

FIG. 7 is a detailed diagram of a third clutch control portion H of the hydraulic control system according to an exemplary embodiment of the present invention.

The third proportional control solenoid valve VFS3 includes an input port 105 and an output port 106. The input port 105 receives the output pressure of the first reducing valve RED1.

The output port 106 supplies the hydraulic pressure of the input port 105 to the third pressure control valve PCV3 and the third pressure switching valve PSW3.

The third pressure control valve PCV3 integrally formed with the third proportional control solenoid valve VFS3 includes a valve body and a valve spool installed therein.

The valve body of the third pressure control valve PCV3 includes first, second, third, fourth, and fifth ports 261, 262, 263, 264, and 265. The first port 261 receives a control pressure from the third proportional control solenoid valve VFS3. The second port 262 receives the forward range pressure from the manual valve MV. The third port 263 selectively supplies the hydraulic pressure received through the second port 262 to the third clutch C3. The fourth port 264 exhausts the hydraulic pressure supplied to the third port 263. The fifth port 265 receives the partial hydraulic pressure of the third port 263 through the third pressure switching valve PSW3.

The valve spool of the third pressure control valve PCV3 includes first, second, and third lands 271, 272, and 273. The first land 271 receives the control pressure supplied from the first port 264. The second land 272 selectively opens or closes the fourth port 264. The third land 273 selectively enables fluid communication of the second and third ports 262 and 263, cooperatively with the second land 272.

An elastic member 274 is arranged between the third land 273 and the valve body so as to form an elastic force for biasing the valve spool toward the first port.

By such an arrangement, the valve spool moves left or right by the control pressure of the third proportional control solenoid valve VFS3 and the elastic force of the elastic member 274, such that the hydraulic pressure supplied through the second port 262 is controlled to be selectively supplied to the third clutch C3 through the third port 263.

The valve body of the third pressure switching valve PSW3 includes first, second, third, fourth, fifth, sixth, and seventh ports 281, 282, 283, 284, 285, 286, and 287. The first port 281 receives the control pressure of the second reducing valve RED2. The second port 282 receives the control pressure of the third proportional control solenoid valve VFS3 from an opposite side of the first port 281. The third port 283 receives a partial pressure of the hydraulic pressure supplied to the third clutch C3. The fourth port 284 is connected with the fifth port 265 of the third pressure control valve PCV3. The fifth port 285 receives the control pressure from the fifth proportional control solenoid valve VFS5. The sixth port 286 supplies the control pressure of the fifth port 285 to the fifth pressure control valve PCV5. The seventh port 287 exhausts the hydraulic pressure supplied to the sixth port 286.

The valve spool of the third pressure switching valve PSW3 includes first, second, and third lands 291, 292, and 293. The first land 291 receives the control pressure supplied through the first port 281. The second land 292 selectively enables the sixth port 286 to fluidly communicate with the fifth port 285 and the seventh port 287, cooperatively with the first land 291. The third land 293 is controlled by the control pressure supplied through the second port 282. The third land 293 selectively enables fluid communication of the third and fourth ports 283 and 284 and fluid communication of the fourth and seventh ports 284 and 287, cooperatively with the second land 292.

An elastic member 294 is arranged between the third land 293 and the valve body so as to form an elastic force for biasing the valve spool toward the first port 281.

By such an arrangement, when the third proportional control solenoid valve VFS3 is turned on, the valve spool moves to the left in the drawing so that the third port 283 is closed and the fourth and seventh port 284 and 287 fluidly communicate with each other. When the third proportional control solenoid valve VFS3 is turned off, the valve spool moves toward the first port by the pressure of the first port 281 so that, the third and fourth ports 283 and 284 fluidly communicate with each other.

Figure 8:
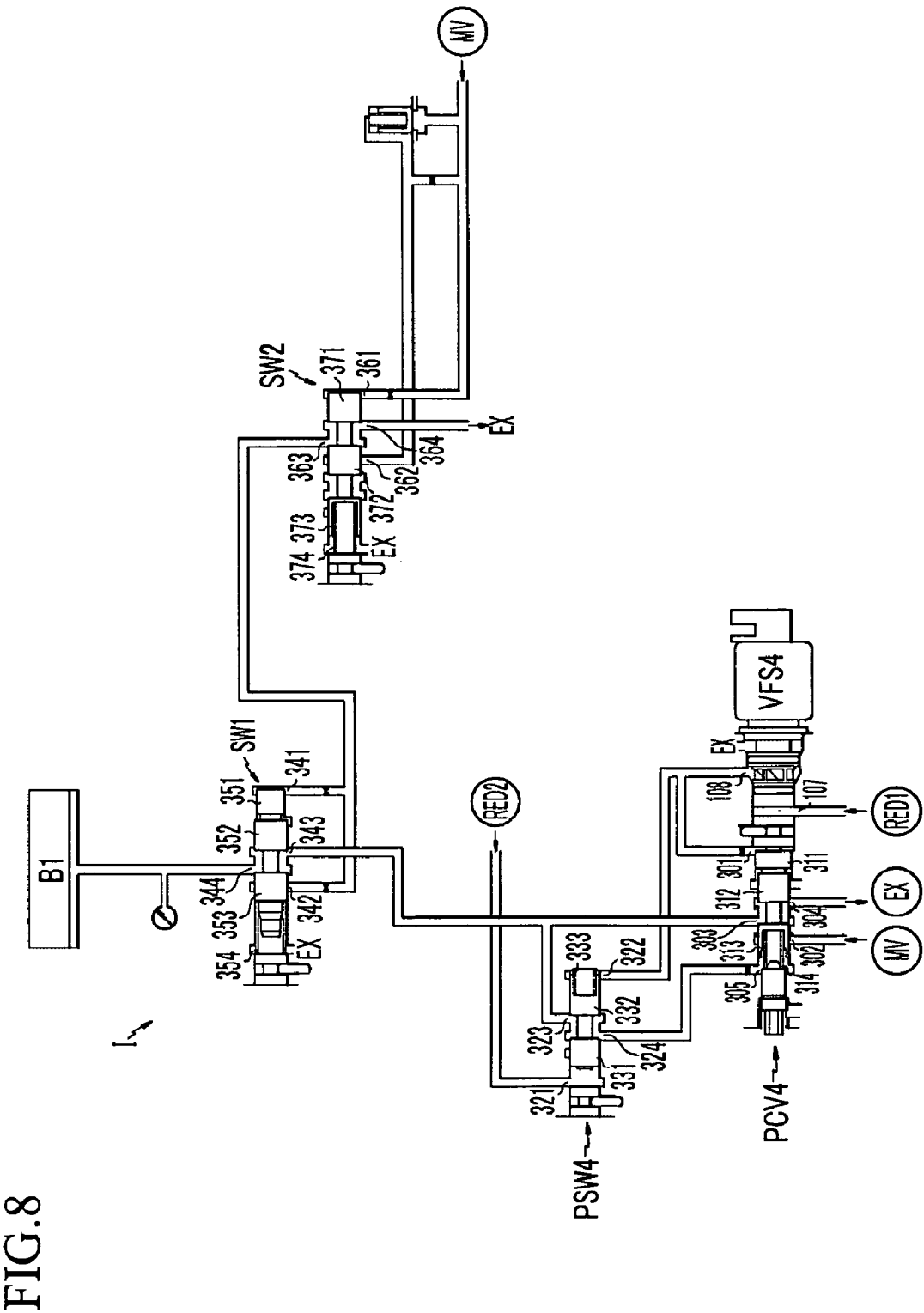
FIG. 8 is a detailed diagram of a first brake control portion of the hydraulic control system according to an exemplary embodiment of the present invention.

FIG. 8 is a detailed diagram of a first brake control portion I of the hydraulic control system according to an exemplary embodiment of the present invention.

The fourth proportional control solenoid valve VFS4 includes an input port 107 and an output port 108. The input port 107 receives the output pressure of the first reducing valve RED1. The output port 108 supplies the pressure of the input port 107 to the fourth hydraulic pressure control valve PCV4 and the fourth pressure switching valve PSW4.

The fourth pressure control valve PCV4 integrally formed with the fourth proportional control solenoid valve VFS4 includes a valve body and a valve spool installed therein.

The valve body of the fourth pressure control valve PCV4 includes first, second, third, fourth, and fifth ports 301, 302, 303, 304, and 305. The first port 301 receives a control pressure from the fourth proportional control solenoid valve VFS4. The second port 302 receives the forward range pressure from the manual valve MV. The third port 303 selectively supplies the hydraulic pressure received through the second port 302 to the first switching valve SW1. The fourth port 304 exhausts the hydraulic pressure supplied to the third port 303. The fifth port 305 receives the partial hydraulic pressure of the third port 303 through the fourth pressure switching valve PSW4.

The valve spool of the fourth pressure control valve PCV4 includes first, second, and third lands 311, 312, and 313. The first land 311 receives the control pressure supplied from the first port 301. The second land 312 selectively opens or closes the fourth port 304. The third land 313 selectively enables fluid communication of the second and third ports 302 and 303, cooperatively with the second land 312.

An elastic member 314 is arranged between the third land 313 and the valve body so as to form an elastic force for biasing the valve spool toward the first port.

By such an arrangement, the valve spool moves left or right by the control pressure of the fourth proportional control solenoid valve VFS4 and the elastic force of the elastic member 314, such that the hydraulic pressure supplied through the second port 302 is controlled to be selectively supplied to the first switching valve SW1 through the third port 303.

The valve body of the fourth pressure switching valve PSW4 includes first, second, third, and fourth ports 321, 322, 323, and 324. The first port 321 receives the control pressure of the second reducing valve RED2. The second port 322 receives the control pressure of the fourth proportional control solenoid valve VFS4 from an opposite side of the first port 321. The third port 323 receives a partial pressure of the hydraulic pressure supplied to the first switching valve SW1. The fourth port 324 is connected with the fifth port 305 of the fourth pressure control valve PCV4.

The valve spool of the fourth pressure switching valve PSW4 includes first and second lands 331 and 332. The first land 331 receives the control pressure of second reduction valve supplied through the first port 321. The second land 332 is controlled by the control pressure supplied through the second port 322. The second land 332 selectively enables fluid communication of the third and fourth ports 323 and 324, cooperatively with the second land 292.

An elastic member 333 is arranged between the second land 332 and the valve body so as to form an elastic force for biasing the valve spool toward the first port 321.

By such an arrangement, when the fourth proportional control solenoid valve VFS4 is turned on, the valve spool of the fourth pressure switching valve PSW4 moves to the left in the drawing so that the third port 323 is closed. When the fourth proportional control solenoid valve VFS4 is turned off, the valve spool moves toward the first port by the pressure of the first port 321 so that the third and fourth ports 323 and 324 fluidly communicate with each other.

The first switching valve SW1 includes a valve body and a valve spool installed therein.

The valve body of the first switching valve SW1 includes first, second, third, and fourth ports 341, 342, 343, and 344. The first port 341 receives the reverse range pressure from the second switching valve SW2 as a control pressure. The second port 342 simultaneously receives the reverse range pressure supplied to the first port 341. The third port 343 receives the control pressure of the fourth pressure control valve PCV4. The fourth port 344 supplies the hydraulic pressure received through the second and third ports 342 or 343 to the first brake B1.

The valve spool of the first switching valve SW1 includes first, second, and third lands 351, 352, and 353. The first land 351 receives the control pressure supplied through the first port 341. The second land 352 selectively opens or closes the third port 343. The third land 353 selectively enables the fourth port 344 to fluidly communicate with the second and third ports 342 or 343, cooperatively with the second land 352.

An elastic member 354 is arranged between the third land 353 and the valve body so as to form an elastic force for biasing the valve spool toward the first port 341.

By such an arrangement, at the forward speeds, the valve spool moves toward the first port by the elastic force of the elastic member 354 such that the third and fourth ports 343 and 344 fluidly communicates with each other. At the reverse speed, the reverse range pressure is supplied to the first port 341 and the second port 342, and accordingly, the valve spool moves to the left in the drawing such that the second and fourth ports 342 and 344 fluidly communicate with each other.

The second switching valve SW2 includes a valve body and a valve spool installed therein.

The valve body of the second switching valve SW2 includes first, second, third, and fourth ports 361, 362, 363, and 364. The first port 361 receives the reverse range pressure from the manual valve MV as a control pressure. The second port 362 simultaneously receives the reverse range pressure supplied to the first port 361. The third port 363 supplies the reverse range pressure of the second port 362 to the first switching valve SW1. The fourth port 364 exhausts the hydraulic pressure supplied to the third port 363.

The valve spool of the second switching valve SW2 includes first, second, and third lands 371, 372, and 373. The first land 371 receives the control pressure supplied through the first port 361. The second land 372 selectively enables the third port 363 to fluidly communicate with the second and fourth ports 362 or 364, cooperatively with the first land 371. The third land 373 is abutted by an elastic member 374.

The elastic member 374 is arranged between the third land 373 and the valve body so as to form an elastic force for biasing the valve spool toward the first port 361.

By such an arrangement, at the forward speeds, the valve spool moves toward the first port by the elastic force of the elastic member 374 such that the third and fourth ports 363 and 364 fluidly communicates with each other. At the reverse speed, the reverse range pressure is supplied to the first port 361, and accordingly, the valve spool moves to the left in the drawing such that the second and third ports 362 and 363 fluidly communicate with each other.

Figure 9:
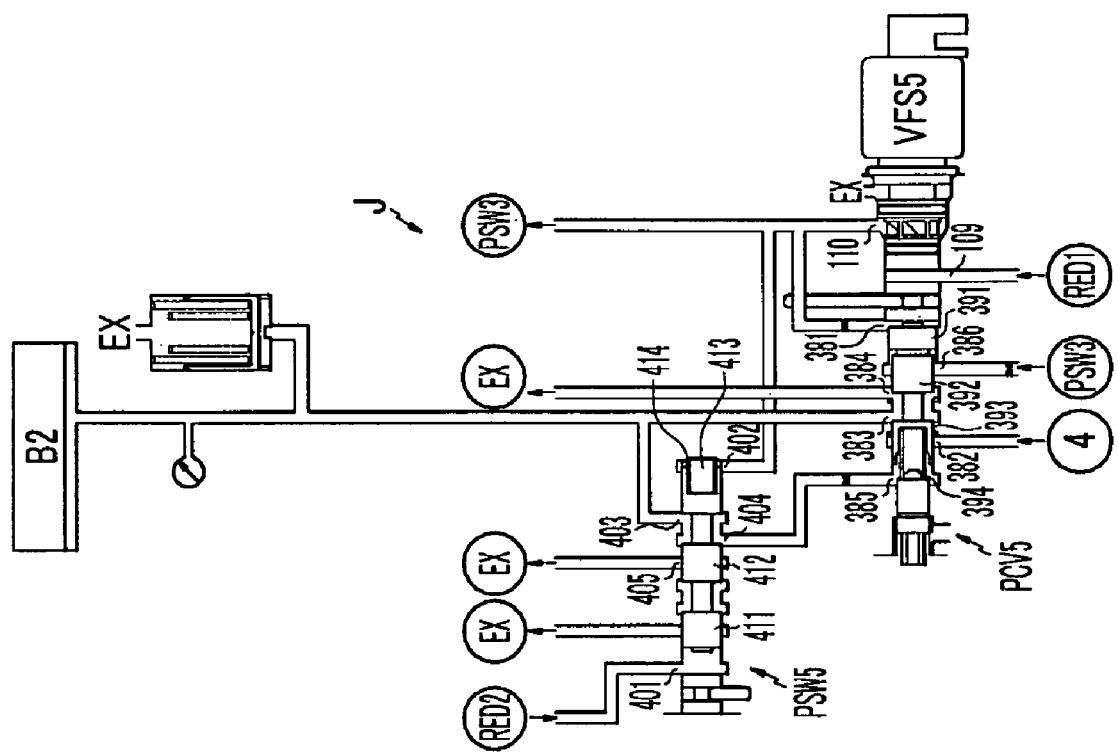
FIG. 9 is a detailed diagram of a second brake control portion of the hydraulic control system according to an exemplary embodiment, of the present invention.

FIG. 9 is a detailed diagram of a second brake control portion J of the hydraulic control system according to an exemplary embodiment of the present invention.

The fifth proportional control solenoid valve VFS5 includes an input port 109 and an output port 110. The input port 109 receives the output pressure of the first reducing valve RED1. The output port 110 supplies the pressure of the input port 109 to the fifth hydraulic pressure control valve PCV5 and the fifth pressure switching valve PSW5, and at the same time, to the third pressure switching valve PSW3.

The fifth pressure control valve PCV5 integrally formed with the fifth proportional control solenoid valve VFS5 includes a valve body and a valve spool installed therein.

The valve body of the fifth pressure control valve PCV5 includes first, second, third, fourth, fifth, and sixth ports 381, 382, 383, 384, 385, and 386. The first port 381 receives a control pressure from the fifth proportional control solenoid valve VFS5. The second port 382 receives the line pressure from hydraulic pump 2. The third port 383 selectively supplies the hydraulic pressure received through the second port 382 to the second brake B2. The fourth port 384 exhausts the hydraulic pressure supplied to the third port 383. The fifth port 385 receives the partial hydraulic pressure of the third port 383 through the fifth pressure switching valve PSW5. The sixth port 386 fluidly communicates with the third pressure switching valve PSW3.

The valve spool of the fifth pressure control valve PCV5 includes first, second, and third lands 391, 392, and 393. The first land 391 receives the control pressure supplied from the first port 381. The second land 392 selectively opens or closes the fourth port 384. The third land 393 selectively enables fluid communication of the second and third ports 382 and 383, cooperatively with the second land 392.

An elastic member 394 is arranged between the third land 393 and the valve body so as to form an elastic force for biasing the valve spool toward the first port.

By such an arrangement, the valve spool moves left or right by the control pressure of the fifth proportional control solenoid valve VFS5 and the elastic force of the elastic member 394, such that the hydraulic pressure supplied through the second port 382 is controlled to be selectively supplied to the second brake b2 through the third port 383.

The valve body of the fifth pressure switching valve PSW5 includes first, second, third, fourth, and fifth ports 401, 402, 403, 404, and 405. The first port 401 receives the control pressure of the second reducing valve RED2. The second, port 402 receives the control pressure of the fifth proportional control solenoid valve VFS5 from an opposite side of the first port 401. The third port 403 receives a partial pressure of the hydraulic pressure supplied to the second brake B2. The fourth port 404 is connected with the fifth port 385 of the fifth pressure control valve PCV5. The fifth port 405 exhausts the hydraulic pressure supplied to the fourth port 404.

The valve spool of the fifth pressure switching valve PSW5 includes first, second, and third lands 411, 412, and 413. The first land 411 receives the control pressure supplied from the first port 401. The second land 412 selectively opens or closes the fifth port 405. The third land 413 is controlled by the control pressure supplied through the second port 402. The third land 413 selectively enables fluid communication of the third and fourth ports 403 and 404.

An elastic member 414 is arranged between the third land 413 and the valve body so as to form an elastic force for biasing the valve spool toward the first port 401.

By such an arrangement, when the fifth proportional control solenoid valve VFS5 is turned on, the valve spool moves to the left in the drawing so that the third port 403 is closed. When the fifth proportional control solenoid valve VFS5 is turned off, the valve spool moves toward the first port by the pressure of the first port 401 so that the third and fourth ports 403 and 404 fluidly communicate with each other.

Shifting operations of the transmission by the hydraulic control system according to an exemplary embodiment of the present invention is hereinafter described in detail. At the first forward speed, a transmission control unit (not shown) turns on the first, fourth, and fifth proportional control solenoid valves VFS1, VFS4, and VFS5. Therefore, the first pressure control valve PCV1 supplies the forward range pressure to the first clutch C1, the fourth pressure control valve PCV4 supplies the forward range pressure to the first brake B1 through the first switching valve SW1, and the fifth pressure control valve PCV5 supplies the line pressure to the second brake B2. Thus, the first forward speed realized.

At the second forward speed, the first proportional control solenoid control valve VFS1 is turned off, and the third proportional control solenoid valve VFS3 is turned on.

Then, while the first and second brakes B1 and B2 is operating, the first clutch C1 is released, and the third clutch C3 is engaged since the third pressure control valve PCV3 supplies the forward range pressure to the third clutch C3. Thus, shifting to the second forward speed is realized.

At the third forward speed, the fourth proportional control solenoid control valve VFS4 is turned off, and the first proportional control solenoid valve VFS1 is turned on.

Then, while the third clutch C3 and the second brake B2 is operating, the first brake B1 is released, and the first clutch is engaged since the first pressure control valve PCV1 supplies the forward range pressure to the first clutch C1. Thus, shifting to the third forward speed is realized.

At the fourth forward speed, the first proportional control solenoid control valve VFS1 is turned off, and, the second proportional control solenoid valve VFS2 is turned on.

Then, while the third clutch C3 and the second brake B2 is operating, the first clutch C1 is released, and the second clutch C2 is engaged since the second pressure control valve PCV2 supplies the forward range pressure to the second clutch C2. Thus, shifting to the third forward speed is realized.

At the fifth forward speed, the third proportional control solenoid control valve VFS3 is turned off, and the first proportional control solenoid valve VFS1 is turned on.

Then, while the second clutch C2 and the second brake B2 is operating, the third clutch C3 is released, and the first clutch C1 is engaged, since the first pressure control valve PCV1 supplies the forward range pressure to the first clutch C1. Thus, shifting to the fifth forward speed is realized.

At the sixth forward speed, the fifth proportional control solenoid control valve VFS5 is turned off, and the third proportional control solenoid valve VFS3 is turned on.

Then, while the first and second clutch C1 and C2 is operating, the second brake B2 is release, and the third clutch C3 is engaged since the third pressure control valve PCV3 supplies the forward range pressure to the third clutch C3. Thus, shifting to the sixth forward speed is realized.

At the seventh forward speed, the third proportional control solenoid control valve VFS3 is turned off, and the fourth proportional control solenoid valve VFS4 is turned on.

Then, while the first and second clutch C1 and C2 is operating, the third clutch C3 is released, and the first brake is engaged since the fourth pressure control valve PCV4 supplies the forward range pressure to the first brake B1 through the first switching valve SW1. Thus, shifting to the seventh forward speed is realized.

At the eighth forward speed, the first proportional control solenoid control valve VFS1 is turned off, and the third proportional control solenoid valve VFS3 is turned on.

Then, while the second clutch C2 and the fourth C4 is operating, the first clutch C1 is released, and the third clutch C3 is engaged since the third proportional control solenoid valve VFS3 supplies the forward range pressure to the third clutch C3. Thus, shifting to the eighth forward speed is realized.

At the reverse speed, the fourth and fifth proportional control solenoid valve VFS4 and VFS5 are turned on. Therefore, the fourth pressure control valve PCV4 supplies the forward range pressure to the first brake B1 though the first switching valve SW1, the fifth pressure control valve PCV5 supplies the line pressure to the second brake B2, and the manual valve MV supplies the reverse range pressure to the first brake B1 through the second switching valve SW2 and the first switching valve SW1. Thus, the reverse speed is realized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of an eight-speed automatic transmission for a vehicle for controlling a first clutch operated at first, third, fifth, sixth, and seventh forward speeds, a second clutch operated at fourth, fifth, sixth, seventh, and eighth forward speeds and a reverse speed, a third clutch operated at second, third, fourth, sixth, and eighth forward speeds and a reverse speed, a first brake operated at first, second, seventh, and eighth forward speeds and a reverse speed, and a second brake operated at first, second, third, fourth, and fifth forward speeds and a reverse speed, the hydraulic control system comprising:
a first clutch control portion that supplies an output pressure of a first pressure control valve to the first clutch, the first pressure control valve being, controlled by output pressures of a first proportional control solenoid valve and a first pressure switching valve;
a second clutch control portion that supplies an output pressure of a second pressure control valve to the second clutch, the second pressure control valve being controlled by output pressures of a second proportional control solenoid valve and a second pressure switching valve;
a third clutch control portion that supplies an output pressure of a third pressure control valve to the third clutch, the third pressure control valve being controlled by output pressures of a third proportional control solenoid valve and a third pressure switching valve;
a first brake control portion that supplies an output pressure of a fourth pressure control valve to the first brake at the first, second, seventh, and eighth forward speeds and a reverse range pressure of a manual valve to the first brake at the reverse speed, the fourth pressure control valve being controlled by output pressures of a fourth proportional control solenoid valve and a fourth pressure switching valve; and
a second brake control portion that supplies an output pressure of a fifth pressure control valve to the second brake, the fifth pressure control valve being controlled by output pressures of a fifth proportional control solenoid valve and a filth pressure switching valve.

2. The hydraulic control system of claim 1, wherein:
the first, third, and fourth pressure control valves control a forward range pressure supplied from the manual valve; and
the second and fifth pressure control valves control a line pressure.

3. The hydraulic control system of claim 1, wherein the first, second, third, fourth, and fifth proportional control solenoid valves is supplied with a reduced pressure of a first reducing valve.

4. The hydraulic control system of claim 1, wherein the first, second, third, fourth, and fifth pressure switching valves are controlled by a reduced pressure of a second reducing valve and the output pressures of the first, second, third, fourth, and fifth proportional control solenoid valves that are independently controlled.

5. The hydraulic control system of claim 1, wherein partial pressures of hydraulic pressures supplied from the first, second, third, fourth, and fifth pressure control valves to corresponding friction members are supplied from the first, second, third, fourth, and fifth pressure switching valves to the first, second, third, fourth, and fifth pressure control valves as their control pressures.

6. The hydraulic control system of claim 1, wherein, in the first clutch control portion:
the first pressure control valve is integrally formed with the first proportional control solenoid valve; and
the first pressure switching valve is controlled by output pressures of the first proportional control solenoid valve and the second reducing valve and supplies a partial pressure of the output pressure of the first pressure control valve to the first pressure control valve as its control pressure.

7. The hydraulic control system of claim 6, wherein the first pressure control valve comprises a valve body and a valve spool,
wherein the valve body of the first pressure control valve comprises:
a first port that receives a control pressure from the first proportional control solenoid valve;
a second port that receives the forward range pressure from the manual valve;
a third port that selectively supplies the hydraulic pressure received through the second port to the first clutch;
a fourth port that exhausts the hydraulic pressure supplied to the third port; and
a fifth port that receives the partial hydraulic pressure of the third port through the first pressure switching valve,
wherein the valve spool of the first pressure control valve comprises:
a first land that receives the control pressure supplied from the first port;
a second land that selectively opens or closes the fourth port; and
a third land that selectively enables fluid communication of the second and third ports, cooperatively with the second land, and
wherein an elastic member is arranged between the third land and the valve body so as to form an elastic force for biasing the valve spool toward the first port.

8. The hydraulic control system of claim 6, wherein the first pressure switching valve comprises a valve body and a valve spool,
wherein the valve body of the first pressure switching valve comprises:
a first port that receives the control pressure of the second reducing valve;
a second port that receives the control pressure of the first proportional control solenoid valve from an opposite side of the first port;
a third port that receives a partial pressure of the hydraulic pressure supplied to the first clutch;
a fourth port that is connected with the fifth port of the first pressure control valve; and
a fifth port that exhausts the hydraulic pressure supplied to the fourth port,
wherein the valve spool of the first pressure switching valve comprises:
a first land that receives the control pressure supplied through the first port and selectively opens and closes the fifth port; and
a second land that receives the control pressure supplied through the second port; and selectively opens or closes the third port and selectively enables fluid communication of the fourth and fifth ports, cooperatively with the first land, and wherein an elastic member is arranged between the second land and the valve body so as to form an elastic force for biasing the valve spool toward the first port.

9. The hydraulic control system of claim 1, wherein, in the second clutch control portion:
the second pressure control valve is integrally formed with the second proportional control solenoid valve; and
the second pressure switching valve is controlled by output pressures of the second proportional control solenoid valve and the second reducing valve and supplies a partial pressure of the output pressure of the second pressure control valve to the second pressure control valve as its control pressure.

10. The hydraulic control system of claim 9, wherein the second pressure control valve comprises a valve body and a valve spool,
wherein the valve body of the second pressure control valve comprises:
a first port that receives a control pressure from the second proportional control solenoid valve;
a second port that receives the line pressure;
a third port that selectively supplies the hydraulic pressure received through the
second port to the second clutch;
a fourth port that exhausts the hydraulic pressure supplied to the third port; and
a fifth port that receives the partial hydraulic pressure of the third port through the second pressure switching valve,
wherein the valve spool of the second pressure control valve comprises:
a first land that receives the control pressure supplied from the first port;
a second land that selectively opens or closes the fourth port; and
a third land that selectively enables fluid communication of the second and third ports, cooperatively with the second land, and
wherein an elastic member is arranged between the third land and the valve body so as to form an elastic force for biasing the valve spool to the right toward the first port.

11. The hydraulic control system of claim 9, wherein the second pressure switching valve comprises a valve body and a valve spool,
wherein the valve body of the second pressure switching valve comprises:
a first port that receives the control pressure of the second reducing valve;
a second port that receives the control pressure of the second proportional control solenoid valve from an opposite side of the first port;
a third port that receives a partial pressure of the hydraulic pressure supplied to the second clutch;
a fourth port that is connected with the fifth port of the second pressure control valve; and
a fifth port that exhausts the hydraulic pressure supplied to the fourth port,
wherein the valve spool of the second pressure switching valve comprises:
a first land that receives the control pressure supplied through the first port;
a second land that selectively opens and closes the fifth port; and
a third land that is controlled by the control pressure supplied through the second port and selectively enables fluid communication of the third and fourth ports and fluid communication of the fourth and fifth ports, cooperatively with the second land, and wherein an elastic member is arranged between the third land and the valve body so as to form an elastic force for biasing the valve spool toward the first port.

12. The hydraulic control system of claim 1, wherein, in the third clutch control portion:
the third pressure control valve is integrally formed with the third proportional control solenoid valve; and
the third pressure switching valve is controlled by output pressures of the third proportional control solenoid valve and the second reducing valve and supplies a partial pressure of the output pressure of the third pressure control valve to the third pressure control valve as its control pressure.

13. The hydraulic control system of claim 12, wherein the third pressure control valve comprises a valve body and a valve spool,
wherein the valve body of the third pressure control valve comprises:
a first port that receives a control pressure from the third proportional control solenoid valve;
a second port that receives the forward range pressure from the manual valve;
a third port that selectively supplies the hydraulic pressure received through the second port to the third clutch;
a fourth port that exhausts the hydraulic pressure supplied to the third port; and
a fifth port that receives the partial hydraulic pressure of the third port through the third pressure switching valve,
wherein the valve spool of the third pressure control valve comprises:
a first land that receives the control pressure supplied from the first port;
a second land that selectively opens or closes the fourth port; and
a third land that selectively enables fluid communication of the second and third ports, cooperatively with the second land, and
wherein an elastic member is arranged between the third land and the valve body so as to form an elastic force for biasing the valve spool to the right toward the first port.

14. The hydraulic control system of claim 12, wherein the third pressure switching valve comprises a valve body and a valve spool,
wherein the valve body of the third pressure switching valve comprises:
a first port that receives the control pressure of the second reducing valve;
a second port that receives the control pressure of the third proportional control solenoid valve from an opposite side of the first port;
a third port that receives a partial pressure of the hydraulic pressure supplied to the third clutch;
a fourth port that is connected with the fifth port of the third pressure control valve;
a fifth port that receives the control pressure from the fifth proportional control solenoid valve;
a sixth port supplies the control pressure of the fifth port to the fifth pressure control valve; and
a seventh port that exhausts the hydraulic pressure supplied to the sixth port,
wherein the valve spool of the third pressure switching valve comprises:
a first land that receives the control pressure supplied through the first port;
a second land that selectively enables the sixth port to fluidly communicate the fifth port or the seventh port, cooperatively with the first land; and a third land that is controlled by the control pressure supplied through the second port; and selectively enables fluid communication of the third and fourth ports and fluid communication of the fourth and seventh ports, cooperatively with the second land, and wherein an elastic member is arranged between the third land and the valve body so as to form an elastic force for biasing the valve spool toward the first port.

15. The hydraulic control system of claim 1, wherein, in the first brake control portion:

the fourth pressure control valve is integrally formed with the fourth proportional control solenoid valve;

the fourth pressure switching valve is controlled by output pressures of the fourth proportional control solenoid valve and the second reducing valve and supplies a partial pressure of the output pressure of the fourth pressure control valve to the fourth pressure control valve as its control pressure;

the first switching valve supplies a hydraulic pressure supplied from the fourth proportional control solenoid valve to the first brake or the reverse range pressure to the first brake; and the second switching valve supplies the reverse range pressure of the manual valve to the first switching valve.

16. The hydraulic control system of claim 15, wherein the fourth pressure control valve comprises a valve body and a valve spool, wherein the valve body of the fourth pressure control valve comprises:

a first port that receives a control pressure from the fourth proportional control solenoid valve;

a second port that receives the forward range pressure from the manual valve;

a third port that selectively supplies the hydraulic pressure received through the second port to the first switching valve;

a fourth port that exhausts the hydraulic pressure supplied to the third port; and a fifth port that receives the partial hydraulic pressure of the third port through the fourth pressure switching valve, wherein the valve spool of the fourth pressure control valve comprises:

a first land that receives the control pressure supplied from the first port;

a second land that selectively opens or closes the fourth port; and a third land that selectively enables fluid communication of the second and third ports, cooperatively with the second land, and wherein an elastic member is arranged between the third land and the valve body so as to form an elastic force for biasing the valve spool toward the first port.

17. The hydraulic control system of claim 15, wherein the fourth pressure switching valve comprises a valve body and a valve spool, wherein the valve body of the fourth pressure switching valve comprises:

a first port that receives the control pressure of the second reducing valve;

a second port that receives the control pressure of the fourth proportional control solenoid valve from an opposite side of the first port;

a third port that receives a partial pressure of the hydraulic pressure supplied to the first switching valve; and a fourth port that is connected with the fifth port of the fourth pressure control valve, wherein the valve spool of the fourth pressure switching valve comprises:

a first land that receives the control pressure supplied through the first port; and a second land that receives the control pressure supplied through the second port and selectively enables fluid communication of the third and fourth ports, cooperatively with the second land, and wherein an elastic member is arranged between the second land and the valve body so as to form an elastic force for biasing the valve spool toward the first port.

18. The hydraulic control system of claim 15, wherein the first switching valve comprises a valve body and a valve spool, wherein the valve body of the first switching valve comprises:

a first port that receives the reverse range pressure from the second switching valve as a control pressure;

a second port simultaneously receives the reverse range pressure supplied to the first port;

a third port that receives the control pressure of the fourth pressure control valve; and a fourth port supplies the hydraulic pressure received through the second or third ports and to the first brake, wherein the valve spool of the first switching valve comprises:

a first land that receives the control pressure supplied through the first port;

a second land that selectively opens or closes the third port; and a third land that selectively enables the fourth port to fluidly communicate with the second or third ports, cooperatively with the second land, and wherein an elastic member is arranged between the third land and the valve body so as to form an elastic force for biasing the valve spool toward the first port.

19. The hydraulic control system of claim 15, wherein: the second switching valve comprises a valve body and a valve spool, wherein the valve body of the second switching valve comprises:

a first port that receives the reverse range pressure from the manual valve as a control pressure;

a second port that simultaneously receives the reverse range pressure supplied to the first port;

a third port that supplies the reverse range pressure of the second port to the first switching valve; and a fourth port that exhausts the hydraulic pressure supplied to the third port, wherein the valve spool of the second switching valve comprises:

a first land that receives the control pressure supplied through the first port;

a second land that selectively enables the third port to fluidly communicate with the second or fourth ports, cooperatively with the first land; and a third land that is abutted by an elastic member, and wherein the elastic member is arranged between the third land and the valve body so as to form an elastic force for biasing the valve spool toward the first port.

20. The hydraulic control system of claim 1, wherein, in the second brake control portion:

the fifth pressure control valve is integrally formed with the fifth proportional control solenoid valve; and the fifth pressure switching valve is controlled by output pressures of the fifth proportional control solenoid valve and the second reducing valve and supplies a partial pressure of the output pressure of the fifth pressure control valve to the fifth pressure control valve as its control pressure.

21. The hydraulic control system of claim 20, wherein the fifth pressure control valve comprises a valve body and a valve spool,
wherein the valve body of the fifth pressure control valve comprises:
a first port that receives a control pressure from the fifth proportional control solenoid valve;
a second port that receives the line pressure;
a third port that selectively supplies the hydraulic pressure received through the second port to the second brake;
a fourth port that exhausts the hydraulic pressure supplied to the third port;
a fifth port that receives the partial hydraulic pressure of the third port through the fifth pressure switching valve; and
a sixth port that fluidly communicates with the third pressure switching valve,
wherein the valve spool of the fifth pressure control valve comprises:
a first land that receives the control pressure supplied from the first port;
a second land that selectively opens or closes the fourth port; and
a third land that selectively enables fluid communication of the second and third ports, cooperatively with the second land, and
wherein an elastic member is arranged between the third land and the valve body so as to form an elastic force for biasing the valve spool toward the first port.

22. The hydraulic control system, of claim 20, wherein the fifth pressure switching valve comprises a valve body and a valve spool,
wherein the valve body of the fifth pressure switching valve comprises:
a first port that receives the control pressure of the second reducing valve;
a second port that receives the control pressure of the fifth proportional control solenoid valve from an opposite side of the first port;
a third port that receives a partial pressure of the hydraulic pressure supplied to the second brake;
a fourth port that is connected with the fifth port of the fifth pressure control valve; and
a fifth port that exhausts the hydraulic pressure supplied to the fourth port,
wherein the valve spool of the fifth pressure switching valve comprises:
a first land that receives the control pressure supplied from the first port;
a second land that selectively opens or closes the fifth port; and
a third land that is controlled by the control pressure supplied through the second port and selectively enables fluid communication of the third and fourth ports, and
wherein an elastic member is arranged between the third land and the valve body so as to form an elastic force for biasing the valve spool toward the first port.

23. The hydraulic control system of claim 1, wherein:
in the first clutch control portion, the first pressure control valve is integrally formed with the first proportional control solenoid valve, and the first pressure switching valve is controlled by output pressures of the first proportional control solenoid valve and the second reducing valve and supplies a partial pressure of the output pressure of the first pressure control valve to the first pressure control valve as its control pressure;
in the second clutch control portion, the second pressure control valve is integrally formed with the second proportional control solenoid valve, and the second pressure switching valve is controlled by output pressures of the second proportional control solenoid valve and the second reducing valve and supplies a partial pressure of the output pressure of the second pressure control valve to the second pressure control valve as its control pressure;
in the third clutch control portion, the third pressure control valve is integrally formed with the third proportional control solenoid valve, and the third pressure switching valve is controlled by output pressures of the third proportional control solenoid valve and the second reducing valve and supplies a partial pressure of the output pressure of the third pressure control valve to the third pressure control valve as its control pressure;
in the first brake control portion, the fourth pressure control valve is integrally formed with the fourth proportional control solenoid valve, the fourth pressure switching valve is controlled by output pressures of the fourth proportional control solenoid valve and the second reducing valve and supplies a partial pressure of the output pressure of the fourth pressure control valve to the fourth pressure control valve as its control pressure, the first switching valve supplies a hydraulic pressure supplied from the fourth pressure control valve to the first brake or the reverse range pressure to the first brake, and the second switching valve supplies the reverse range pressure of the manual valve to the first switching valve; and
in the second brake control portion, the filth pressure control valve is integrally formed with the fifth proportional control solenoid valve, and the fifth pressure switching valve is controlled by output pressures of the fifth proportional control solenoid valve and the second reducing valve and supplies a partial pressure of the output pressure of the fifth pressure control valve to the fifth pressure control valve as its control pressure.

* * * * *